United States Patent [19]
Alfiero

[11] Patent Number: 5,915,758
[45] Date of Patent: Jun. 29, 1999

[54] BRIDGE FOR LOW RESISTANCE ELECTRICAL CONNECTIONS AND METHOD OF USING SAME

[76] Inventor: Joseph A. Alfiero, 364 Stewart Ave., Apt. A4, Garden City, N.Y. 11530

[21] Appl. No.: 08/564,376

[22] Filed: Nov. 24, 1995

[51] Int. Cl.$^6$ .................................................. H01R 43/00
[52] U.S. Cl. .............................. 29/854; 29/858; 439/388; 439/762; 439/927
[58] Field of Search ..................... 29/858, 854; 439/388, 439/762, 927

[56] References Cited

U.S. PATENT DOCUMENTS

| | | | |
|---|---|---|---|
| 1,687,262 | 10/1928 | Vaughn | 439/762 |
| 2,168,250 | 8/1939 | Toiberg et al. | |
| 2,255,862 | 9/1941 | Sherrill | |
| 2,462,453 | 2/1949 | Akin | |
| 2,925,579 | 2/1960 | Osborn | |
| 2,962,689 | 11/1960 | Johnson et al. | |
| 3,152,854 | 10/1964 | Osborn | |
| 3,397,382 | 8/1968 | Shannon | |
| 3,662,322 | 5/1972 | Morrison | |
| 3,704,440 | 11/1972 | Bradley | |
| 3,831,271 | 8/1974 | Pedler | 29/858 |
| 4,037,009 | 7/1977 | Severinsen | |
| 4,062,613 | 12/1977 | Tritenne | 439/388 |
| 5,087,214 | 2/1992 | Dewar | |
| 5,558,545 | 9/1996 | Staab et al. | 439/388 X |

OTHER PUBLICATIONS

Research Disclosure, May 1991, No. 325 "Electrical Contact Mesh" 32567.

*Primary Examiner*—Carl J. Arbes
*Attorney, Agent, or Firm*—Wechsler & Wechsler, P.C.; Lawrence I. Wechsler

[57] ABSTRACT

A conductive bridge receivable between confronting surfaces of electrical contacts to be electrically joined with one another provides a low-resistance union and resistance to mechanical and conductive deterioration when used in accordance with the disclosed method. The bridge includes electrically conductive component portions dispersed along the lateral expanse between the confronting surfaces, presenting conduction regions on each of two opposed sides of the bridge, positioned to provide a plurality of contact points which face each of the confronting contacts. The conduction regions on one of the sides are electrically communicative across the bridge to ones on the opposed side thereof, thereby providing a plurality of spaced-apart, discrete conductive conduits through which electricity may be conducted between the confronting contacts. When the contacts are urged together to bring the surfaces thereof into intimate engagement with at least a portion of the plurality of conduction regions on both sides of the bridge, conductive contact is established and current is permitted to flow therebetween, through the bridge via each conduction region conductively engaging the contact surfaces. The conductive component portions are either a plurality of conduction regions interconnected to form a contiguous bridge element, or alternatively consist of discrete particulate elements, conveniently carried in an agent which facilitates application between confronting contact surfaces to be electrically joined. Insulating sealant may be optionally provided to inhibit deterioration due to the effects of moisture and other environmental corrosives.

21 Claims, 6 Drawing Sheets

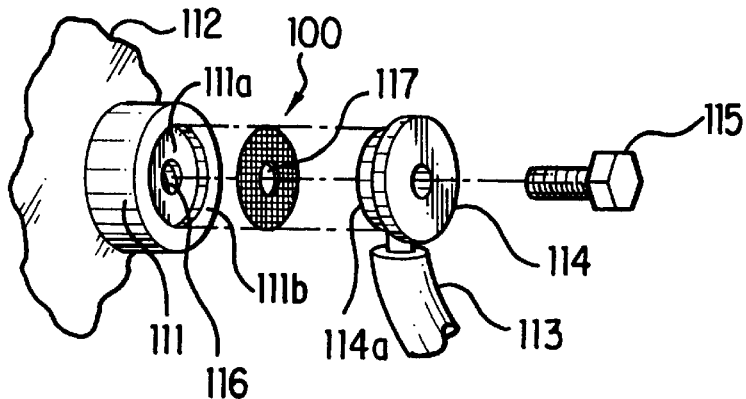
FIG. 6
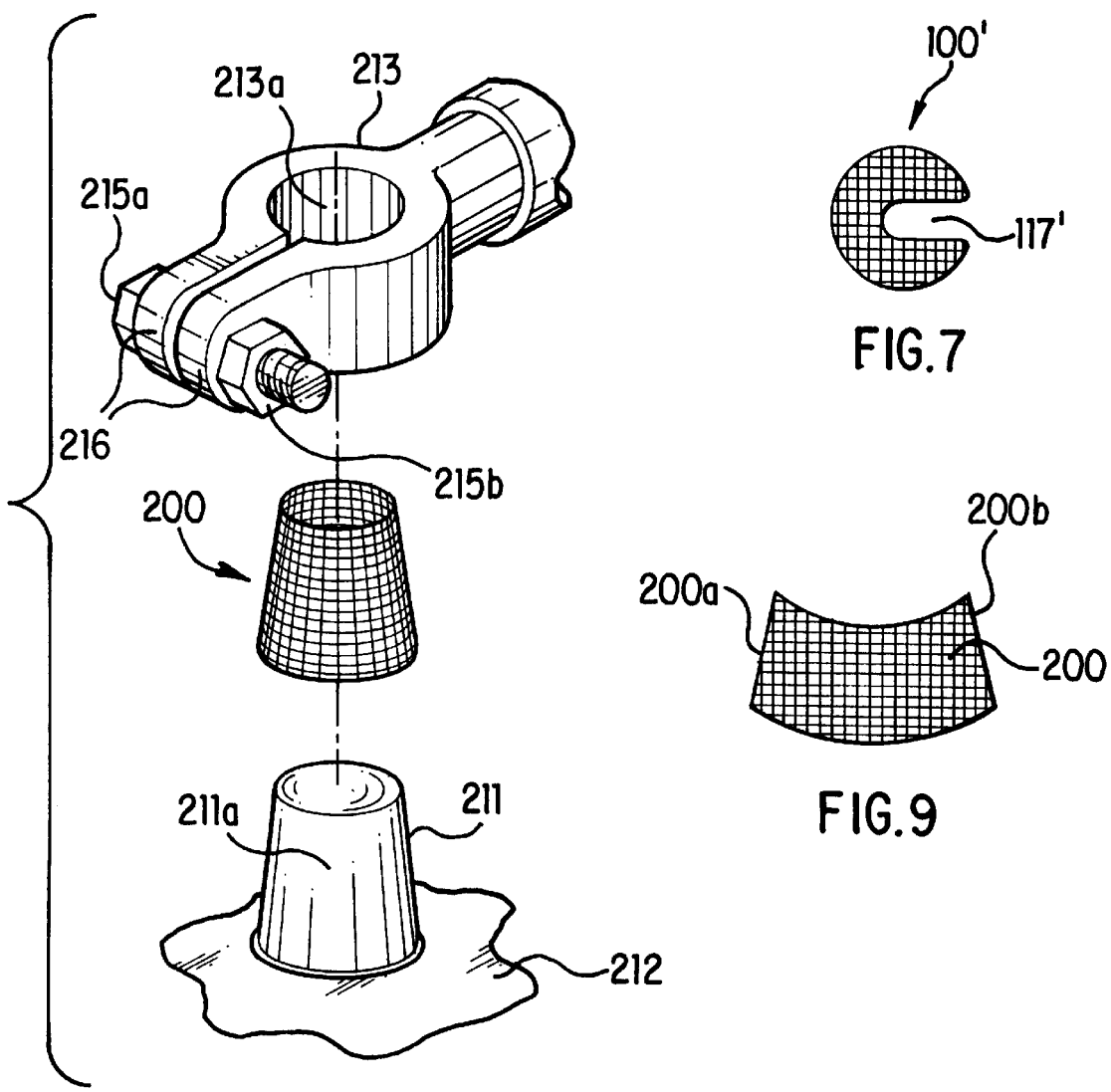
FIG. 8
FIG. 7
FIG. 9

BRIDGE FOR LOW RESISTANCE ELECTRICAL CONNECTIONS AND METHOD OF USING SAME

BACKGROUND OF THE INVENTION

This invention relates to an electrical bridge for providing a low resistance junction between confronting electrical contact surfaces, and more particularly a bridge for use with electrical conductor cables and other circuit elements to be electrically joined with one another, which maintains low resistance contact integrity over time, by protecting the contacting surfaces from vibration and corrosion caused by exposure to the elements.

Electrical junctions in the prior art generally rely on direct pressure contact between confronting, electrically conductive contacting surfaces. The contact surfaces are of generally complimentary shape and are presumed to be in close enough contact over sufficient area portions thereof to minimize electrical resistance across the junction, thereby providing an electrically efficient connection. However, various practical factors may reduce the efficiency of such unions. For example, any high spots present on either surface can have an adverse effect on contact efficiency by preventing the contacting surfaces from being sufficiently joined over a remainder thereof. Sheering movement between the contact surfaces brought about by vibration and the like, may also adversely affect electrical integrity of the connection during prolonged use in environments where such factors are present, such as, for example, in automobile applications. Moreover, pitting of the surfaces caused by exposure to the elements, or electrical arching due to imperfect electrical contact, can result in deterioration of the connection over time. In addition, because the contacts are brought together in close, but not perfect contact, capillary action may exacerbate the deleterious effects of exposure to moisture by drawing any liquid present at the periphery of the contact surfaces inwardly to the inner contact regions.

A particularly challenging application for low-resistance connectors relates to the connection of electrical cables to storage batteries of automobiles. Because of high current demand, particularly during start-up, a low resistance battery/cable connection is essential for proper automobile operation. Progressive deterioration of an initially satisfactory electrical connection is common in prior art battery connectors, due to the harsh environmental factors to which components within the engine compartment are typically exposed. Such contact degradation will adversely affect start-up, and a resultant failure to provide proper charging voltage may potentially reduce battery life.

Storage batteries of the type used in automobiles, trucks and other like vehicles generally include terminal posts comprised of lead alloy material, and are either cylindrical in shape when side mounted, or frustro-conically shaped when located atop the battery. When adapted for use with a side terminal battery, a conventional cable connector typically includes a thick, washer-shaped portion, which overlays the flat end of the cylindrical battery terminal, and is fastened thereto by a bolt received in a threaded central hole in the terminal post. In the case of top terminal batteries, the connector consists of a generally U-shaped structure including a pair of parallel arms projecting from the open end of the U, through which extends a bolt threaded into a companion nut, allowing the connector to be tightened about the post received through the U-shaped portion. Such connectors as described above have generally been either die cast from various alloys of lead, copper or zinc, or alternatively stamped and formed from sheet metal.

Secure mechanical connection is essential, particularly in automotive applications, since electrical resistance must be optimally reduced to meet high current demand. It had heretofore been assumed that the relatively large available surface area of contact between the cable connector and the battery terminal would alone be sufficient to consistently provide a conductively efficient union when contact surfaces were brought into pressurized alignment. However, empirical evidence has proved otherwise. Even when initially attained, a mechanically secure, low resistance connection achieved as described above, may be compromised by sustained vibration. Exposure to air, water, engine oil vapors, spilled anti-freeze, etc., as well as extreme temperature variations, have been invariably shown to further reduce electrical efficiency of the connection through corrosion.

Because of the commercial desirability of developing a low resistance car battery/cable connector, attempts have been made in the prior art to improve performance of such devices by improving electrical continuity between cable and battery, and further providing enhanced resistance to angular rotation. For example, U.S. Pat. No. 5,087,214 issued to Dewar, describes one such attempt in which the inner surface of a connector is provided with inwardly facing edges adapted to penetrate the relatively soft material of the terminal post and inhibit rotation of the connector about the post. Although effective in providing improved conductivity and resistance to vibrational disturbance, the invention does not have application for side terminal batteries, nor does it address the problem of corrosion due to exposure to the elements for either top or side terminal batteries. Moreover, the connector described in the above patent cannot be easily adapted to an existing conventional battery connection, its use requiring removal and replacement of an existing conventional cable connector.

Another particularly problematic electrical connector application involves electrical power distribution. These systems generally rely on electrical transmission via buss bars which are bolted in overlapping engagement to one another, to produce a pressure contact electrical union between confronting surfaces. Because of the high current load of such applications, an increase of resistance of such union may result in generation of significant heat, sometimes extreme enough to melt the buss bars, potentially causing catastrophic failure of the connection. Exposure to water and other environmental factors may reduce the long-term effectiveness of such buss bar connections, as generally noted above, adding to the potential of system failure. Therefore it would be highly desirable to provide an improved low resistance connection between confronting contact surfaces suitable for use in high-power applications that reliably maintains contact integrity over time.

OBJECTS AND SUMMARY OF THE INVENTION

Accordingly, it is an object of the invention to provide an electrical bridge, for providing a low-resistance electrical union which overcomes the drawbacks of the prior art.

Another object of the invention to provide an electrical bridge which achieves a superior mechanical and electrical connection resistant to various forces including sheer, torque and vibrational.

It is a further object of the present invention to provide an electrical bridge for use in applications where a high current demand requires that contact integrity be maintained over time, such as when adapted for use in automobiles, and a method of achieving the connection.

It is yet a further object of the invention to provide such a bridge in a form which adequately protects the contacting surfaces from corrosion by air, corrosive liquids and vapors, moisture, and/or temperature variations, and a method of using same.

It is a still further object of the invention to provide such a bridge in a form which is simple and inexpensive to construct, and which is easily installed in existing conventional applications connecting a cable to an electrical terminal or cables with one another.

It is a yet further object of the invention to provide the bridge in a form suitable for use in connecting an electrical cable to a battery post of an automobile, being applicable to either side or top terminal batteries.

It is a still further object of the invention to provide a bridge kit for improving electrical efficiency of a cable connection to a battery terminal in an automobile or other vehicle, and for providing maintained efficiency over time.

It is a still further object of the invention to provide a bridge in a form suitable for use in connecting buss bars used in high-power distribution applications that reliably maintains contact integrity over time, inhibiting system failure.

Briefly stated, the invention comprises a conductive bridge receivable between confronting surfaces of electrical contacts to be electrically joined with one another, the surfaces thereof having flat or curved configuration. The bridge includes electrically conductive component portions dispersed along the lateral expanse between the confronting surfaces, presenting conduction regions on each of two opposed sides of the bridge, positioned to provide a plurality of contact points which face each of the confronting contacts. The conduction regions on one of the sides are electrically communicative across the bridge to ones on the opposed side thereof, thereby providing a plurality of spaced-apart, discrete conductive conduits through which electricity may be conducted between the confronting contacts. When the contacts are urged together to bring the surfaces thereof into intimate engagement with at least a portion of the plurality of conduction regions on both sides of the bridge, conductive contact is established and current is permitted to flow therebetween, through the bridge via each conduction region conductively engaging the contact surfaces. The combined conductivity of all discrete conduction regions provides a low-resistance connection when a sufficient number, depending on the particular design parameters, are brought into intimate contact engagement, on both sides thereof, with the confronting contact surfaces. The aggregate contact area made up of the combined total of the plurality of discrete conduction regions in intimate contact with the contact surfaces determines the efficiency of the electrical union. In various embodiments, the conductive component portions are either a plurality of conduction regions interconnected to form a contiguous bridge element, or alternatively consist of discrete particulate elements, conveniently carried in an agent which facilitates application between confronting contact surfaces to be electrically joined.

According to an embodiment of the invention, the conductive bridge comprises an integrated bridge element of contiguous structure receivable between confronting surfaces of contacts to be electrically joined. Use of such bridge element is especially practical since it may be readily interposed between existing contact elements, the envelope shape thereof being easily adaptable for use with any number of existing contact configurations, for example, between any standard cable connector and the associated contacting surface of a car battery terminal. The bridge element is advantageously of generally uniform envelope thickness, each opposed side thereof having a multitude of discrete conduction regions projecting therefrom relative a remaining portion of the particular side. The bridge envelope will define a widened structure generally conforming in shape to the contact surface configurations, conveniently having a relatively thin form to provide flexibility and optimally permit conformance of the bridge element to the shape of the confronting contact surfaces. Such bridge element structure defines two opposed sides thereon, each facing an associated one of the contact surfaces to be joined. Such bridge element comprises, in its broadest sense, a multitude of highly conductive contacting regions, each such conduction region being separated from others along the bridge element expanse either by an open space or gap, or alternatively, protruding outwardly, relative a remaining portion of a particular one of the opposed sides. In both instances, the loci of apices of the contacting regions collectively define an initial thickness envelope, i.e. the contacting regions are the first portions of bridge element to make contact with the confronting contacts when same are urged together, and make initial contact therewith when confronting contact surfaces are separated by the initial thickness envelope of the bridge element. Continued urging together of the contact surfaces deformably compresses the outwardly disposed conduction regions, and/or, partially embeds same into the confronting contact surfaces between which they are sandwiched, depending upon the relative hardness of each. In either instance, the conduction regions and the engaged surface of the confronting contact are of conforming surface shapes to provide intimate contact therebetween over at least an area portion of the conduction region. Flexibility of the bridge element ideally permits conformance of the envelope shape thereof to the shape of the confronting contact surfaces, thereby facilitating intimate contact engagement of a substantial portion of the conduction regions with the joined confronting contact surfaces, and optimally providing an electrically efficient union.

In accordance with the above described embodiment, the bridge element may comprise a grid-like, lattice structure, in which the solid portions of the bridge defining such lattice function as the discrete conduction regions. A woven, molded or stamped mesh, as well as mesh formed from expanded foils, for example, will provide such lattice configuration. Alternatively, unbroken structure defining discrete conduction regions may be achieved by texturing the surface of the bridge element during molding or by machining, or by mechanical deformation of the entire bridge element structure. For example, a suitable surface configuration may be attained by mechanical deformation which includes dimpling the bridge element from each side to form corresponding raised peaks on the sides opposed thereto, or by folding the element to form a series of corrugated ridges or a waffle-like texture along its expanse. As will be apparent, however, where the bridge structure is attained by mechanical deformation thereof, the conduction regions on a one side of the bridge element will not be directly opposed to ones protruding from the remaining opposed side thereof. The bridge element may alternatively include an untextured structure to which conductive particulate elements are braised or soldered. The bridge element has a suitable envelope of shape to conform to the contact configuration of a particular application, for reception between the confronting electrical contact surfaces. When placed therebetween, the raised conduction regions disposed on both sides of the bridge element are the first portions thereof to be brought into conductive contact with corresponding confronting contact surfaces as the contacts are urged together. As contact pressure is applied, for example when a battery connector is clamped securely to a terminal of a car battery, the discrete conduction points of the bridge material initially make conductive contact with the contact surfaces. Continued urging together of the contacts, permitted by virtue of the recessed areas between the conduction points, compresses, and/or, partially embeds the conduction points into one or both contacting surfaces, thereby forming a superior electrical contact by assuring multiple points of intimate, conductive contact between confronting contacts surfaces. The configuration further resists angular rotation, resulting from, for example, vibrational sheering forces and the like, commonly present, for example, in an engine compartment of an automobile. The degree of pressure required to sufficiently urge the contacts together to produce an electrically efficient union will depend on the mechanical characteristics of a particular bridge element, as well as the various design parameters of a particular application, including, in addition to the current and voltage demands, mechanical disturbance and other environmental stress factors to which the union will be exposed. A low-resistance connection between the contacts is established when a sufficient portion of the raised surface portions, each of which defines a discrete conduction region, is brought into intimate contact on both sides of the bridge element with each respective contact surface, such that the aggregate area of the discrete conduction regions in contact therewith is sufficient to provide unrestricted flow of current across the bridge. Intimate contact for purposes of this disclosure is defined as conforming engagement of a conduction region over an area portion thereof with a portion of the confronting contact surface in pressure contact therewith.

In an advantageous embodiment, a bridge element is comprised of a contiguous conductive lattice, such as mesh or screen, optimally comprised of a malleable and highly conductive material, such as, for example, copper or silver. The lattice structure may be formed, for example, by stamping, molding, or by weaving a plurality of wire filaments in a cross-wise manner. Such lattice form provides superior flexibility of the overall bridge envelope, and simplifies production of the bridge element by permitting a part having an appropriate envelope of shape to be easily stamped from a larger sheet of material, and subsequently formed into a suitable shape for configuratively conforming to the contact surfaces of any desired application. Where a woven metallic screen material is used for the bridge element, the filaments overlap ones arranged crosswise thereto, defining, at the points of intersection, discrete conduction regions of greater thickness than that of the individual filaments. When confronting electrical contacts, between which is received a bridge element of the described configuration are brought together, these discrete conduction points are first to engage each of the opposed contact surfaces. Urging together of the contacts deforms the screen intersection points and/or embeds same into the opposed surfaces in contact therewith, depending on the relative malleability of the metal composition of each of the components. Continued urging brings the confronting contact surfaces into conductive contact with the remaining portions of the screen filaments, which then function also as discrete conduction regions. The cross-sectional area of the combined total of all discrete conduction regions brought into contact with contact surfaces on each side of the bridge element determines the efficiency of the electrical union.

Such bridge element configuration, the performance of which is optimized in part due to its flexibility, generally provides a current path through a multitude of individual bridge conduction locations by readily conforming to the surface contours of the confronting contact surfaces over its widened expanse. The wire filaments comprising the mesh, when received between the contact surfaces urged together in compressed engagement, provide enhanced surface area of electrical contact, assuring a low-resistance connection.

In a particularly advantageous embodiment, a flowable moisture-insulating material is used as a sealing agent to fill-in the spaces present between the confronting contact surfaces and the non-contacting regions of the bridge element separating the discrete conduction regions therealong. The presence of such insulating sealing agent inhibits deterioration of the connection by discouraging moisture, which might enter an exposed periphery of the joined contacts, from reaching the multitude of internal conduction locations, thus ensuring a permanent, low-resistance connection even when same is exposed to the elements. The sealing agent may be applied to the bridge element as a paste or viscous liquid immediately prior to an urging together of the contacts. When pressure is exerted on the bridge element from either side by the contacts, any excess sealant is forced away from the discrete raised bridge conduction regions at their point of intimate contact engagement with the contact surfaces, permitting low-resistance electrical contact thereof with the confronting contact surfaces. Optimally, an appropriately selected sealing agent will bond to the metal contact surfaces of the union in the areas between the discrete conduction regions for enhanced protection against moisture see page. Alternatively, an insulating sealing agent which advantageously demonstrates an elastic nature in its hardened state may be applied to the bridge element and allowed to cure prior to use. In the case of a bridge element having conduction regions which protrude along a contiguous expanse relative to a remainder of each of opposed sides, the sealing agent is applied to both sides of the bridge element to fill-in the recessed regions between the protruding contact regions. Where the bridge element is comprised of a mesh or screen, in which the recessed regions comprise open gaps separating the discrete conduction regions, the bridge element is impregnated with the insulating sealing agent to fill the openings. The elastic nature of the insulating material allows the raised surface conduction regions to penetrate any excess insulating sealant and directly engage the confronting contact surfaces when pressure is applied thereto by the urged confronting contacts, thereby providing an electrically efficient connection therebetween. Many types of elastomers, such as, for example, silicone rubber, as well as other flowable substances with resilient characteristics, are suitable for such application. The insulating sealing agent need not be electrically insulating, and is included to insulate rather against moisture and other potentially corrosive agents.

In an alternate embodiment, the conductive bridge medium of the invention, rather than comprising a contiguous structural bridge element, may instead be a conglomeration of metallic particulate elements conveniently dispersed throughout a suitable viscous carrying agent as a suspension mixture. The bodies may be particles having, for example, a roughly spherical shape, or filaments, comprising for example, a wool-like material. A quantity of the mixture, optimally having the consistency of a paste, is applied between the electrical contact surfaces, such as for example between a battery terminal and the contacting surface of the cable connector. When the confronting contact surfaces are urged together into conductive contact with the conductive particulate elements, electrical flow is permitted across the particles, the outermost surfaces of which function as discrete conduction regions electrically bridging the confronting contacts. Optionally selecting a silicone rubber or other similar material that will cure over time as the carrier for the particles, additionally creates a corrosion-proof and highly conductive electrical connection.

The above embodiments are suited for a wide variety of applications, including among these, the particularly advantageous examples of automobile battery connections. For top terminal batteries having frustro-conically shaped terminals, for example, a bridge element in accordance with the above stated guidelines would have a corresponding frustro-conical envelope of shape receivable over the terminal for reception between same and a cable clamp. Similarly, a bridge element suitable for use with a side terminal battery in which a flat, circular surface provides the electrical contact region, would have a flat, disk-shaped envelope for reception between these contact surfaces to be joined in overlapping engagement. In addition, a bridge in a form suitable for use in connecting buss bars used in high-power distribution applications would be appropriately shaped for reception between the confronting contact surfaces of the buss bars to be joined.

The present invention is particularly suited to its embodiment as a kit with which all components necessary to convert a standard electrical connection into a union according to the invention are provided, so that the user has at hand, with purchase of a kit, all that is needed to achieve that end. Such a kit would contain a suitable number of contiguous bridge elements corresponding to the requirements of the particular application, or a quantity of flowable bridge paste material, and a cleaning device for preparing the contact surfaces prior to reception of the bridge therebetween. In kits providing one or more contiguous bridge elements, such kit could optionally further include a supply of flowable insulating sealant to prevent environmental deterioration of the connection, for application to the bridge element at the time of installation. For ease of installation, a wrench or other suitable tool for loosening and tensioning the urging means by which the contacts surfaces are held in pressurized engagement, could optionally be included.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1b is a cross-sectional view taken at line Ib—Ib in 1a;

FIG. 2b is a cross-sectional view taken at line IIb—IIb in FIG. 2a;

FIG. 3b is a cross-sectional view taken at line IIIb—IIIb in FIG. 3a;

FIG. 6 is an exploded perspective view of a bridge element in accordance with the invention shown in use on a side terminal battery;

FIG. 7 is an alternative embodiment of a bridge element in accordance with the invention including a central slot for use on a side terminal battery;

FIG. 8 is an exploded perspective view of the component parts of an embodiment of a bridge element in accordance with the invention shown in use on a top terminal automobile battery;

FIG. 9 is a plan view of an unconstructed die-cut bridge element for use on a top terminal automotive battery.

DETAILED DESCRIPTION OF THE PREFERRED EMBODIMENT

Figure 1A:
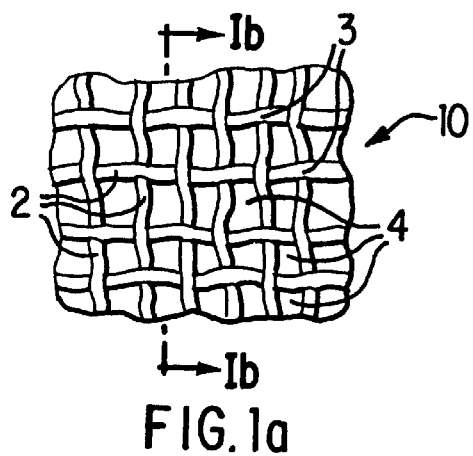
FIG. 1a is a detail plan view of a structural configuration of an embodiment of a bridge element in accordance with the invention.

The invention provides an electrical connection of low resistance and prolonged performance, accomplished through use of a conductive bridge receivable between confronting electrical contact surfaces to be electrically joined. In its broadest sense, the bridge includes discrete electrically conductive component portions dispersed along a lateral expanse corresponding to each of the confronting contact surfaces, presenting conduction regions on each of two opposed sides of the bridge, positioned to provide a plurality of contact points which face each of the confronting contacts. The conduction regions disposed on one of the sides are electrically communicative across the bridge to ones on the opposed side thereof, thereby providing a plurality of spaced-apart, discrete conductive conduits, or paths, through which electricity may be conducted between the confronting contacts. The conduction regions are configured such that when urged together, the confronting contact surfaces make contact initially with the confronting contact surfaces prior to contacting remaining bridge regions separating the conduction regions. Continued urging together of the confronting contacts brings the confronting contact surfaces into intimate engagement with at least a portion of the plurality of conduction regions on both sides of the bridge to establish conductive contact of the bridge with the confronting contacts, and current is permitted to flow therebetween through the bridge. The combined conductivity of all discrete conduction regions communicative from one side of the bridge to the other provides a low-resistance connection when a sufficient number of conduction regions, depending on the particular design parameters, are brought into intimate contact engagement, on both sides thereof, with the confronting contact surfaces. The aggregate contact area comprised of the combined total of the plurality of discrete conduction regions in intimate contact with the contact surfaces determines the efficiency of the electrical union. Depending upon the relative hardness of the metallic components of the bridge comprising the conduction regions and of the confronting contact surfaces, continued urging of the contacts, facilitated by the presence of the recessed regions disposed between the discrete conduction regions, either deformably compresses the conduction regions or results in same being embedded into the surfaces thereof. In both cases, however, continued urging together of the contacts insures that a substantial portion of the plurality of discrete conduction regions are brought into intimate contact engagement with the confronting contact surfaces, regardless of topographical irregularities of the contact surfaces, thereby optimally providing a low resistance union which resists torque induced or sheering type motion between contacts. It is noted that the portions of the bridge element separating the conduction regions are referred to in the disclosure as being recessed, which term shall include reference to portions that protrude to a lesser degree, and will also embrace regions completely lacking of material, such as a gap between mesh filaments.

The bridge, in its various conceivable embodiments, can take a wide range of forms. For example, the conduction points may be either interconnected to form a contiguous bridge element employing a variety of envelope shapes and surface configurations, or alternatively consist of discrete particulate elements, which when conveniently carried in a viscous agent, facilitates application between confronting contact surfaces to be electrically joined.

In broad terms, a bridge element in accordance with the invention, is comprised generally of contiguous structure, including a plurality of discrete conduction regions disposed on each exposed surface therealong which compressively engage a corresponding one of confronting contact surfaces to be bridged. The conduction regions, disposed on either side of the bridge element protrude outwardly relative a remaining portion of a side thereof on which it is disposed. The distance across the bridge element measured between a loci of apices of the plurality of conduction regions on each side of the bridge element defines a perceived initial bridge thickness envelope. Conduction regions on one side of the bridge element are conductively interconnected across the bridge element to ones on a remaining side. To this end, the bridge element may be conveniently comprised entirely of a conductive material, in a form presenting a lattice structure, such as a mesh or screen, produced by stamping, molding, or weaving a plurality of crossing filaments. Alternatively, a material having conductive properties presenting an unbroken expanse may be suitably textured to present a surface configuration which includes a plurality of discrete conduction regions therealong. These discrete regions may be formed by texturing the surface of the bridge element during molding or by machining, or alternatively by mechanical deformation or bending of the entire bridge element structure. For example, a suitable surface configuration achieved by deformation may be attained by dimpling the bridge element from each side by striking the bridge with a tool having a sharpened projection to form corresponding raised peaks on the sides opposed thereto. The element formed by bending may take a form including a series of corrugated ridges or a waffle-like texture along its expanse, achieved by suitable metal forming techniques. Alternatively, the bridge element may include an untextured metallic structure to which conductive particulate elements are braised or soldered. Still further, the bridge element may be made only partially of conductive material, including further, additional non-metallic material as a support structure for carrying a plurality of conductive elements along a widened expanse thereof, the discrete conductive elements presenting outwardly facing conduction contact regions, and ones located on a one side of the bridge element being conductively communicative across the thickness of the bridge element to ones located on an opposed side thereof.

Figure 1B:
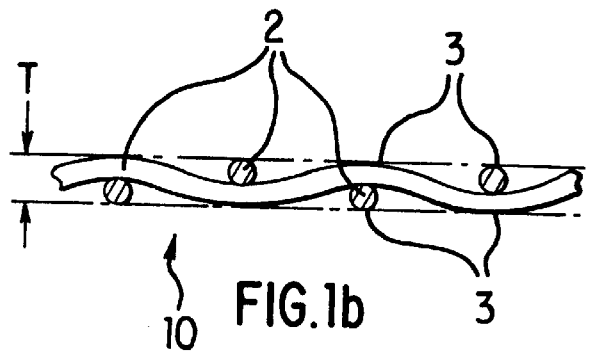

Referring now to the figures, and in particular FIGS. 1–3, there are shown illustrative examples of structural configuration, and in particular the contact surface arrangement of various bridge elements which may be employed in practicing the invention. The integral structure of the bridge elements are depicted in detail showing different conduction region arrangements. These structural configurations relating to the discrete conduction regions will find application in a wide range of bridge elements suited for various applications, and are independent of the overall size and envelope shape of the bridge element in its entirety, which will be advantageously designed to be conformably received in the region between confronting contacts. It is noted that many other forms are possible in excess of these particular illustrative depictions without departure from the invention, when produced in conformance with the broad guidelines outlined above.

FIG. 1. shows a bridge element 10, which includes a plurality of intersecting metallic wires 2, woven to form an open lattice mesh, or screen, presenting a plurality of rectangular openings 4 between adjacent wires. Bridge element 10 is thickest at points of intersection 3 of wires 2, where they overlap. When placed between confronting contact surfaces which are subsequently urged together, these intersection points 3 of the lattice structure are the first portions of bridge element 10, on each sides thereof, to engage a corresponding one of the contact surfaces. Intersection points 3 thereby provide a plurality of conduction regions into which current may pass from a confronting contact to bridge element 10, and out of bridge element 10 on an opposed side thereof, into the opposed confronting contact upon passing therethrough. Bridge element 10 therefore has a perceived initial envelope of thickness T, defined by the distance across the loci of apices of the plurality of conduction regions on respective sides of bridge element 10, which, in the present example, are the outermost surfaces of intersection points 3. Phrased another way, perceived initial envelope of thickness T is that distance by which contact surfaces are separated when the confronting contacts initially engage the conduction regions of bridge element 10.

Figure 2A:
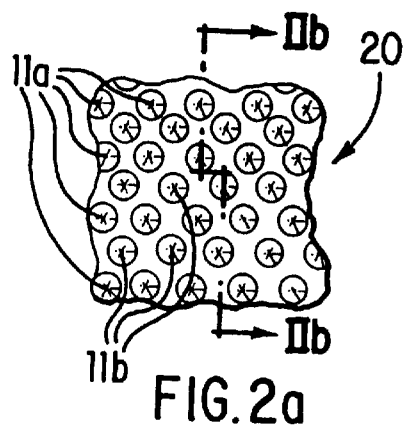
FIG. 2a is a detail plan view of a structural configuration of another embodiment of a bridge element in accordance with the invention.
Figure 2B:
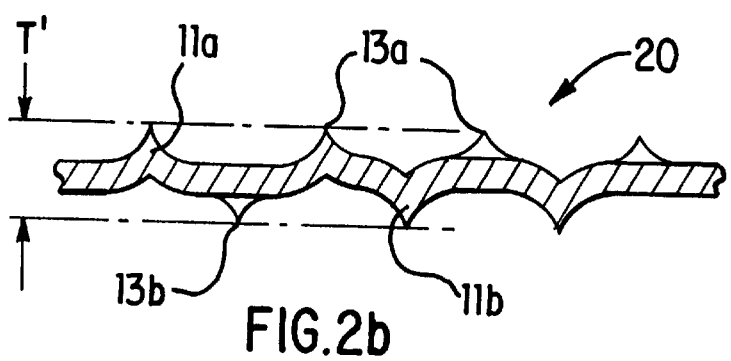
Figure 3A:
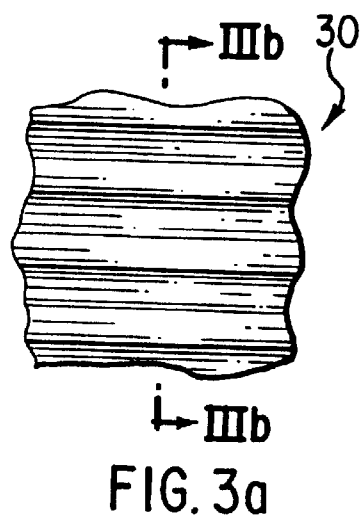
FIG. 3a is a detail plan view of a structural configuration of another embodiment of a bridge element in accordance with the invention.
Figure 3B:
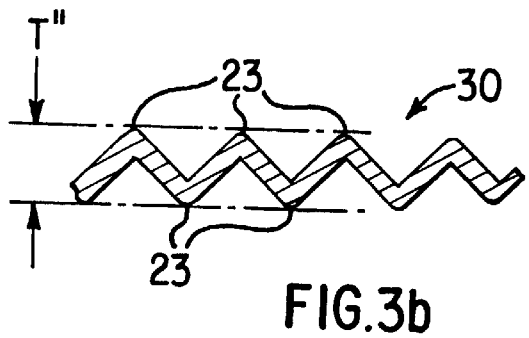

Turning now to FIG. 2, a bridge element 20 in accordance with an embodiment of the invention is comprised of a plurality of raised peaks 11, produced by mechanical deformation of an initially smooth metallic sheet advantageously having uniform thickness. Peaks 11a and 11b are arranged to protrude alternately from both sides of bridge element 20, being conveniently formed by applying pressure with a tool including a sharpened projecting portion, or a plurality thereof (tool not shown), directed from a side opposed to the direction of protrusion of the peaks 11a being formed, sufficient in force to outwardly deform the bridge material to form raised peaks 11a on an opposite side of bridge element 20. The same procedure is performed with the deformation pressure exerted from the opposed side, the pointed tool oriented with the projecting points disposed on non-deformed remaining portions of the bridge element to create peaks 11b. Alternatively, the deformation of the bridge element can be accomplished by simultaneous deformation from both directions by disposing the non-deformed blank for the bridge element 20 between two halves of an appropriately designed compression tool, each half thereof having inwardly facing opposed sharpened projection parts. The resultant bridge element 20, as shown in FIGS. 2a and 2b, has perceived thickness envelope T' defined by the distance between the respective loci of apices 13a and 13b of peaks 11a and 11b.

FIG. 3 depicts another embodiment of a bridge element in accordance with the invention, and in which conduction regions are formed by mechanical deformation of a bridge element 30, in this instance accomplished by a bending operation. Bridge element 30 is bent in consecutively alternate directions to produce a corrugated structure having a plurality of longitudinal apices 23, the aggregate of which on both sides of bridge element 30 collectively define a perceived bridge thickness envelope T".

With regard to any of the bridge elements 10, 20 and 30 described above, general parameters for structural design and composition are analogous for each embodiment, as well as additional conceivable embodiments within the scope of the invention. For example, the conductive material comprising a bridge element in accordance with the invention is conveniently metallic, and advantageously a malleable, highly conductive composition, comprised for example of copper or silver, or a combination of both. The bridge element is also advantageously sufficiently thin, and of substantially uniform thickness over its widened expanse, so as to permit conformable moldability to the configuration and topographical shape of the contact surfaces between which it is designed to be received. Alternatively, as already mentioned herein, the above guidelines may be incorporated in a bridge element comprised partially of a non-conducting material, providing for example overall support means, and interspersed conduction regions, conveniently of metallic composition, integral therewith and disposed on and protruding from both sides thereof, same being conductively communicative across the thickness of the bridge element.

Function of the above described illustrative structural examples is described with reference to FIGS. 4, 5a and 5b. For purposes of disclosure, the structure described with regard to the embodiment depicted in FIGS. 1a and 1b received between planar confronting contact surfaces has been conveniently chosen to demonstrate the mechanism involved in achieving the goals of the invention. It will be apparent that other structural embodiments, for example those depicted in FIGS. 2a and 2b, and 3a and 3b, and possibly received between confronting contacts of differing configuration, function analogously, and therefore do not require further illustration.

Figure 4:
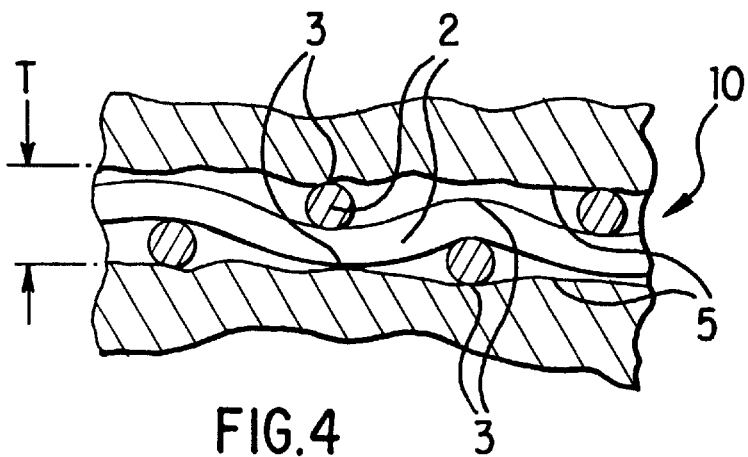
FIG. 4 is a partial cross-sectional detail view of the bridge element embodiment of FIG. 1a and 1b received between confronting contacts in initial contact engagement therewith.
Figure 5A:
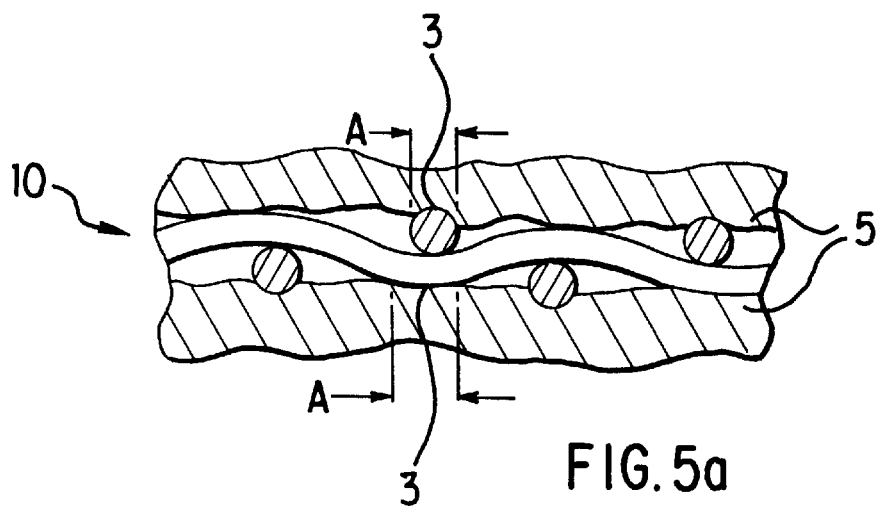
FIG. 5a is a partial cross-sectional detail view of the embodiment of FIG. 4, depicting further urging of confronting contacts, wherein the bridge element is embedded into confronting contacts comprised of a more malleable material.
Figure 5B:
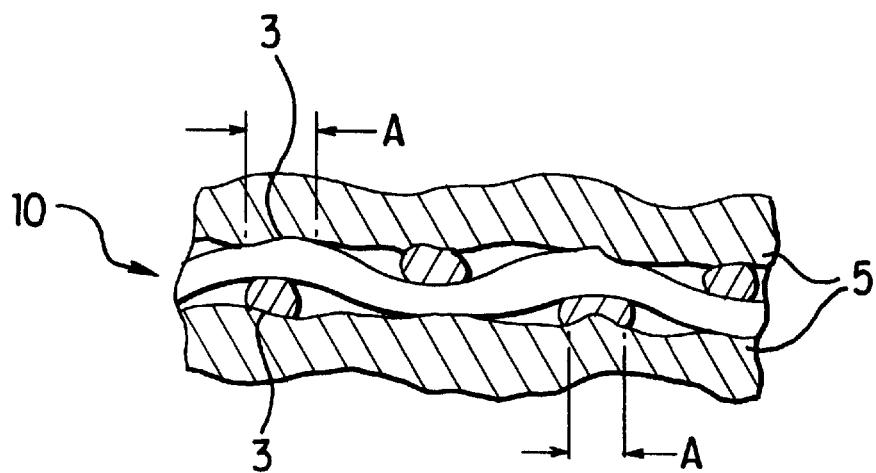
FIG. 5b is a partial cross-sectional detail view of the embodiment of FIG. 4, depicting further urging of confronting contacts, wherein the bridge element is conformably deformed embedded by confronting contacts comprised of harder material.

Referring now to FIG. 4, bridge element 10 is depicted as interposed between two confronting contacts 5. Surface irregularities, which are ordinarily present on electrical contacts, have been exaggerated for illustrative purposes. Confronting contacts 5 are urged together, and make initial contact with bridge element 10 when separated by a distance roughly equal to perceived initial bridge thickness envelope T (give or take variations due to contact surface irregularities) as shown in FIG. 4. As shown, some of conduction regions at intersection points 3 make initial contact with surfaces of confronting contacts 5 while others may not, due to contact surface irregularities.

As confronting contacts 5 are urged further together beyond perceived initial bridge thickness envelope T by application of contact pressure, more and more conduction regions 3 are brought into intimate engagement over area surfaces A of confronting contacts 5 with which they are in contact. This is accomplished either by bridge element 10 being embedded in confronting contacts 5 when confronting contacts 5 are comprised of relatively softer material than bridge element 10, and providing conformable contact engagement over surface areas of engagement A, as depicted in FIG. 5a, or by compression deformation of bridge element 10 by confronting contacts 5 when the converse is true, in which instance bridge element 10 malleably conforms to the surface configuration of confronting contacts 5 over regions of engagement A, as shown in FIG. 5b. In both cases, at least a portion of conduction regions 3 are in conformable, or intimate, engagement with confronting contacts 5 over area portions A thereof. The regions of intimate contact A provide a plurality of paths of electrical continuity into and out of bridge element 10. The aggregate area of the combined total of all discrete conduction regions brought into intimate contact over area portions A with contact surfaces on each side of bridge element 10 determines the efficiency of the electrical union.

The above described bridge element configurations are adaptable to many applications, particularly those requiring maintenance of a low-resistance connection typically exposed to stress. The invention is particularly well suited for use in automobiles, trucks, boats and other vehicles, where battery connections are regularly exposed to vibrational and environmental hazards.

Referring now to FIG. 6, there is shown an embodiment of an electrical bridge in accordance with the present invention, directed to use in connecting a cable to a side terminal car battery. Although referred to as a car battery, it is noted that the depicted embodiment will also have application for other vehicles employing analogously configured battery connections. The electrical bridge includes a bridge element 100 receivable between confronting contact surfaces present on each of a typically used cable and terminal. Bridge element 100 is comprised of the structural configuration of the type described with regard to FIGS. 1a and 1b for illustration purposes, but may alternatively embody other configurations within the scope of the invention as outlined above. The car battery of the type depicted includes a battery terminal post 111, (only one of a pair is depicted) of generally cylindrical shape, which extends from a side of a car battery 112, and includes a flat post end surface 111a recessed below a shoulder portion 111b. A battery cable 113 includes a lug connector 114 of stepped configuration disposed at a free end thereof, which provides a flat lug contact surface 114a on a smaller diameter portion thereof for conductively affixing cable 113 to battery post 111. When used conventionally, the smaller diameter portion of lug connector 114 is received in the recess defined by shoulder portion 111b, centering lug connector 114 with respect to battery terminal post 111. Contact surface 114a of lug connector 114 overlays post end surface 111a, and is bolted thereto by a bolt 115 which is threadingly received within an axially bored threaded receiving hole 116 in battery post 111. In accordance with the invention as depicted, bridge element 100 is dimensioned to permit reception within the recess defined by shoulder portion 111b, interposed between post end surface 111a and lug contact surface 114a, prior to bolting same together. Bridge element 100 includes means for receiving bolt 115 therethrough, conveniently in the form of structure defining a centrally formed clearance hole 117. Alternatively, the bridge structure can instead define a slot 117' extending from a peripheral edge of a bridge element 100' to a central portion thereof, instead of a hole, allowing bridge element 100' to be slidingly received between loosened contact surfaces, without having to completely remove bolt 115 from battery post 111 during installation thereof, the alternate bridge configuration as shown in FIG. 7.

Referring now FIG. 8, there is shown an embodiment of an electrical bridge in accordance with the invention, directed to use on a top terminal car battery. A bridge element, generally designated 200 is depicted in position for reception between confronting contact surfaces of a standard top terminal battery 212 and a conventionally used cable terminal 213. Bridge element 200 may be comprised of any of the above suggested materials and structural configurations, but for illustration purposes has conveniently been depicted as made of a flexible, highly conductive filament mesh, in accordance with the general configurational guidelines as described with regard to FIGS. a and 1b, and includes an appropriate envelope of shape to fit over a battery post 211 of a top terminal battery 212. Analogous to the side terminal battery embodiment described above, top terminal battery 212 has two battery posts 211, of which only one is shown. Since battery post 211 is frustro-conically shaped, as illustrated, bridge element 200 is conformingly configured to have a matching envelope of size and shape, permitting bridge element 200 to slip over the battery post 211 and seat in a position in which the inwardly facing surface expanse thereof is in conformable contact with the post contact surface 211a. Cable terminal 213 has an inner contacting surface 213a conforming in shape with battery post 211 (and bridge element 200). A bolt 215a which extends through a pair of outwardly projecting arms 216 disposed on an end of cable terminal 213 and which is threadingly engaged with a nut 215b, permits tightening of cable terminal 213 about battery post 211, bridge element 200 received between confronting contact surfaces, which in the instant embodiment comprise the inner contacting surface 213a of cable terminal 213 and post contact surface 211a. Since conventional posts and terminal connectors are generally cast from various alloys of lead, copper or zinc, making them relatively malleable, continued application of such urging pressure embeds bridge element 200, made of a harder material, into both contact surfaces of battery post 211 and cable terminal 213. The resultant electrical union resists rotational torque and vibrational forces, to provide a more reliable and enduring connection. It is noted that it may alternatively be desirable to make bridge element 200 of a more malleable material that the confronting contacts, in which case it is deformable compressed, instead of embedded, upon application of contact pressure.

Although many methods of manufacturing frustro-conical bridge element 200 are suitable to its construction, bridge element 200 may produced conveniently and economically by a process including stamping a flat expanded projectional shape from a larger sheet of suitably configured bridge element material having structure in accordance with the guidelines discussed, and subsequently bending the flat blank into a frustro-conical shape. FIG. 9 illustrates bridge element 200 in the form of a flat, stamped blank prior to three dimensional forming. Bridge element 200 is stamped in the shape as depicted, and subsequently rolled into a frustro-conical envelope, the finished shape being maintained in this desired position by fastening of a side 200a to another side 200b along the meeting seam. In an alternative manufacturing process, frustro-conically shaped bridge element 200 could be produced by deformation of a flat, circular blank in a frustro-conically shaped press which comprises conforming male and female forming parts, between which the blank would be received during the shaping process.

In a particularly advantageous embodiment, means for inhibiting deterioration of the established bridged connection brought about by environmental factors is provided in the form of a sealing agent, which when applied to a bridge element in accordance with the invention, insulates the interior contact regions therealong from seepage of moisture and other corrosive agents which may enter from exposed peripheral edges of the union. The sealing agent is advantageously applied to the bridge element as well as both contact surfaces to be joined as a paste or viscous liquid immediately prior to an urging together of the contacts. When pressure is exerted on the bridge element from either side by the contacts, any excess insulating sealant is forced away from the discrete raised bridge conduction regions at their point of intimate contact engagement with the contact surfaces, permitting an unobstructed low-resistance electrical contact thereof with the confronting contact surfaces. The remaining amounts of sealing agent remain trapped in the spaces present between the confronting contact surfaces and the non-contacting regions of the bridge element separating the discrete conduction regions therealong. In the case of a bridge having a lattice structure, the sealing agent fills the spaces defined by the crossed filaments. Where the bridge is of the type in which the conduction regions protrude from an unbroken structure, a remainder thereof being recessed with respect thereto, the sealing agent fills in the gaps present between the facing confronting contact surface, and the recessed regions present between the protruding conduction regions. In selecting a suitable sealant for use in protecting the electrical union, the following are considered advantageous to the invention, in providing optimum resistance against contact degradation. The substance should include the characteristic of the good adhesion properties to metals and plastics in its flowable state, and when optionally curable, also in its hardened state. It should be non-corrosive to metals, plastics and other materials ordinarily present in and around electrical contacts. Further, The sealing agent should be rated for use over a wide temperature range, resistant to cycling, and be resistant to water and chemicals found near the subject application, such as, for example in automotive use, battery electrolyte and antifreeze. The sealant should also advantageously not be excessively brittle, rather more resilient. Examples of suitable non-curing materials for use as a sealant include bees wax and non-corrosive grease. A curable silicone type adhesive seal, such as Dow Corning® 3145 RTV which has been used with excellent results, is believed to provide optimal protection against seepage of corrosives from the periphery of the contacts by adhering to the metal contact surfaces of the union in the areas disposed between the discrete conduction regions.

Alternatively, a curable insulating sealant which demonstrates an elastic nature in its hardened state, may be applied to the bridge element well in advance of installation and allowed to cure prior to use. This obviates the need for application at the time of installation, simplifying this procedure. In the case of a bridge element having conduction regions which protrude along a contiguous expanse relative to a remainder of each of opposed sides, the sealant is applied to both sides of the bridge element to fill-in the recessed regions between the protruding contact regions. Where the bridge element is comprised of a mesh or screen, in which the recessed portions comprise open gaps separating the discrete conduction regions, the bridge element is impregnated with the insulating sealant advantageously with an amount sufficient to fill the open gaps. The elastic nature of the insulating material allows the raised surface conduction regions to penetrate any excess insulating material and directly engage the confronting contact surfaces when pressure is applied thereto by the urged confronting contacts, thereby providing an electrically efficient connection therebetween. Many types of elastomers, such as, for example, silicone rubber, as well as other flowable substances with resilient characteristics, are suitable for such application. The insulating sealant need not be electrically insulating, and is utilized to insulate rather against moisture.

In yet another embodiment, the electrical bridge, rather than comprising a contiguous structural bridge element, instead comprises a conglomeration of metallic particulate elements conveniently dispersed as a suspension mixture throughout a suitable carrying agent, advantageously having a high viscosity. The bodies may be particles having, for example, a roughly spherical shape, or may include filaments, comprising for example, a wool-like material. A quantity of the mixture, optimally having the consistency of a paste, is applied between the electrical contact surfaces, such as for example between a battery terminal and the contacting surface of the cable connector. When the confronting contact surfaces are urged together into conductive contact with the conductive particulate elements, electrical flow is permitted across the particles, the outermost surfaces of which function as discrete conduction regions electrically bridging the confronting contacts. Optionally selecting a silicone rubber or other similar material chosen based upon the characteristics outlines with regard to the preceding embodiment, that will cure over time, as the carrier for the particles, additionally creates a corrosion-proof in addition to a highly conductive electrical connection.

Figure 10:
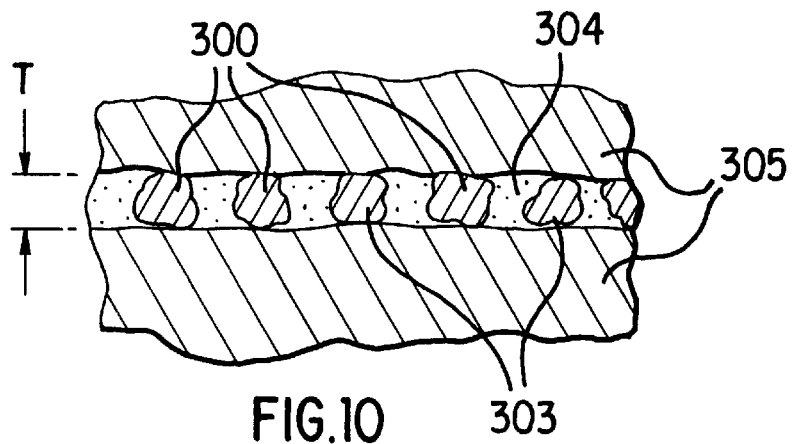
FIG. 10 is a partial cross-sectional detail view of a bridge comprised of particulate elements mixed with carrying agent received between confronting contacts in initial contact engagement therewith.
Figure 11A:
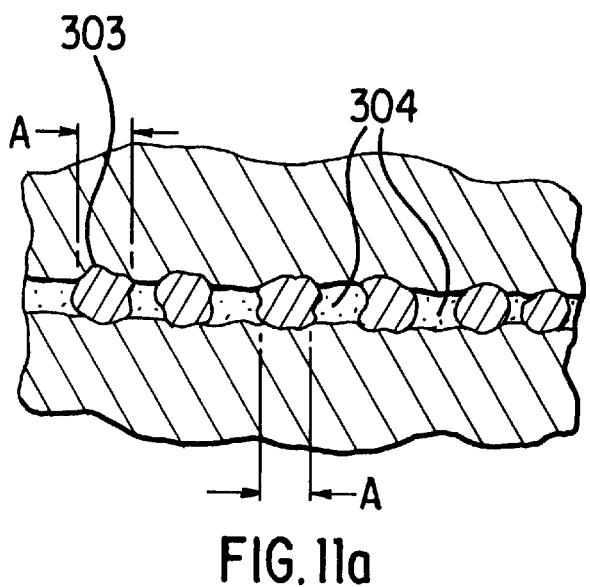
FIG. 11a is a partial cross-sectional detail view of the embodiment of FIG. 10, depicting further urging of confronting contacts, wherein the particulate elements are embedded into confronting contacts comprised of a more malleable material.
Figure 11B:
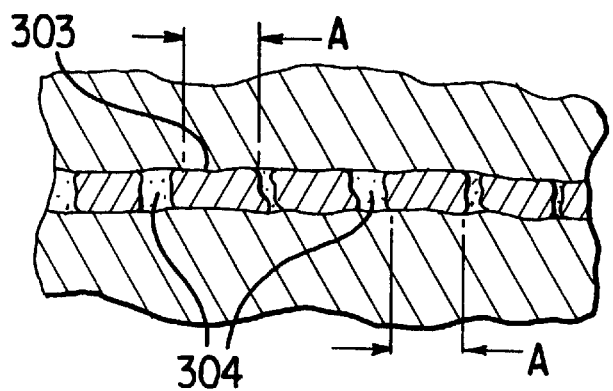
FIG. 11b is a partial cross-sectional detail view of the embodiment of FIG. 10, depicting further urging of confronting contacts, wherein the particulate elements are conformably deformed embedded by confronting contacts comprised of harder material.
Figure 12:
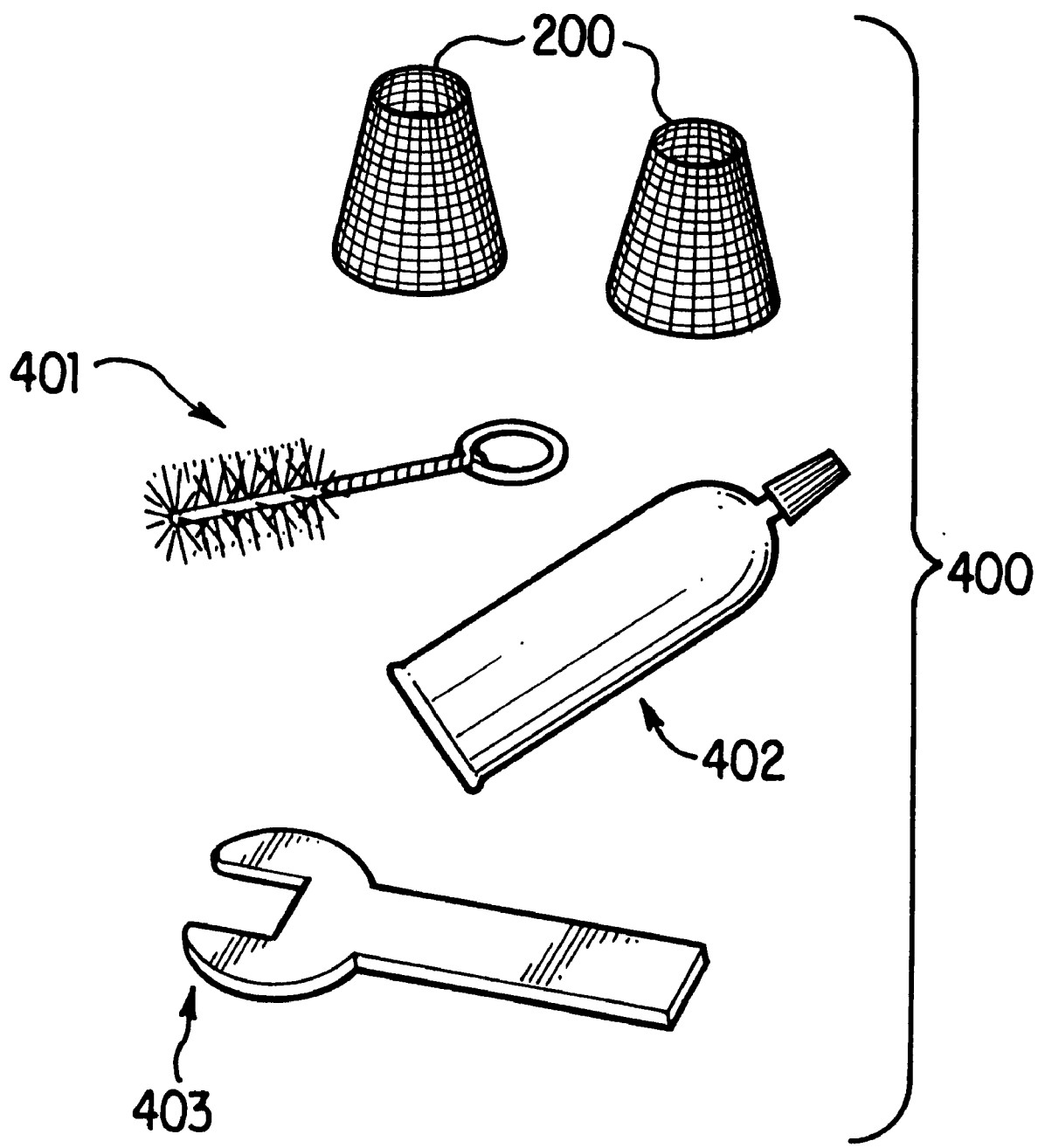
FIG. 12 is a perspective view of a kit for use in modifying an existing top terminal automotive battery connection.

The function of the above described particulate form of the bridge in accordance with the invention is shown in FIGS. 10, 11*a* and 11*b*. The bridge includes a plurality of particulate elements 300, each shown to have a generally irregular spherical shape, each of the particulate elements 300 advantageously having a uniform size. Other structural shapes are contemplated, such as for example elongated filaments, cylindrical segments or a variety of other shapes which present conductive surfaces functioning as conduction regions 303 on sides thereof facing respective confronting contacts 305. Particulate elements 300 are received between confronting contact surfaces 305 conveniently chosen as planar to demonstrate the mechanism involved in achieving the goals of the invention. It will be apparent that other particulate structural embodiments received between confronting contacts of differing configuration function analogously, without need for their individual illustration.

Referring in particular to FIG. 10, particulate elements 300 dispersed throughout a carrying agent 304 are interposed between two confronting contacts 305 in which surface irregularities thereof have been exaggerated for illustrative purposes. Confronting contacts 305 are urged together, and due to variations in particle size make initial contact with at least a portion of particulate elements 300 having the largest diameter when separated by a distance roughly equal to perceived initial bridge thickness envelope T. Perceived initial bridge envelope thickness T in the present embodiment is based on the thickness of a single layer of particulate elements 300, and is therefore equivalent to the size of the larger of the individual particulate elements 300. Carrying agent 304 is forced aside from conduction regions 303 by the applied contact pressure to enable electrical continuity between conduction regions 303 and the surface of confronting contact 305 with which it is in electrical contact. As shown, some of conduction regions 303 make initial contact with surfaces of confronting contacts 305 while others may not, due to contact surface irregularities and the aforementioned variation in particle size.

As confronting contacts 305 are urged further together beyond perceived initial bridge thickness envelope T by application of contact pressure, more and more conduction regions 303 are brought into intimate engagement over area surfaces A of confronting contacts 305 with which they are in contact. This is accomplished either by particulate elements 300 being embedded in confronting contacts 305 when confronting contacts 305 are comprised of relatively more malleable material than particulate elements 300, thereby providing conformable contact engagement over surface areas of engagement A, as depicted in FIG. 11*a*, or by compression deformation of particulate elements 300 by confronting contacts 305 when the converse is true, in which instance particulate elements 300 malleably conform to the surface configuration of confronting contacts 305 over regions of engagement A, as shown in FIG. 11*b*. In both instances, at least a portion of conduction regions 303 are in intimate engagement with confronting contacts 305 over area portions A thereof. The regions of intimate contact A provide a plurality of paths of electrical continuity into and out of each particulate element 300. The aggregate area of the combined total of all discrete conduction regions brought into intimate contact over area portions A with contact surfaces on each side of each of the particulate elements 300 determines the efficiency of the electrical union.

It is noted that where particulate elements 300 are filamentous, such as for example comprising copper or steel wool, the individual fibers, tangled with one another, may obviate the need to provide carrying agent 304 to hold such particulate elements together in a convenient manner. In this instance, the fibrous conductive material could be fashioned in an appropriate shape analogous with construction of a contiguous bridge element as has been described for disposition between confronting contact surfaces.

In another embodiment in accordance with the invention, a kit is provided for use in modifying an existing electrical connection, in the disclosed example a top terminal automotive battery connection, the kit generally designated 400. Kit 400 includes bridge elements 200 for reception between each of the battery terminals and corresponding cable terminals. Means are provided loosening the connector bolt which maintains contact pressure, conveniently in the form of a wrench 403 dedicated to the particular size bolt head used in the application for which kit 400 is suited. Means are further provided for preparing the contact surfaces prior to reception of bridge elements 200 therebetween, conveniently for example in the form of a stiff wire brush 401. Alternatively, other cleaning and polishing devices may be substituted or supplied in addition to brush 401, such as for example a file, which for the present application would have an abrasive frustro-conically shaped receiving chamber, or a grit-carrying polishing cloth or paper. Optionally such contact cleaner may include a fluid solvent for removing grease and the like may also be provided. Kit 400 would optionally provide a supply of sealant, advantageously a curable type as described above, for use in protecting the electrical union from moisture and the elements, where such was desired, conveniently provided, for example, in a sealed tube 402.

Figure 13:
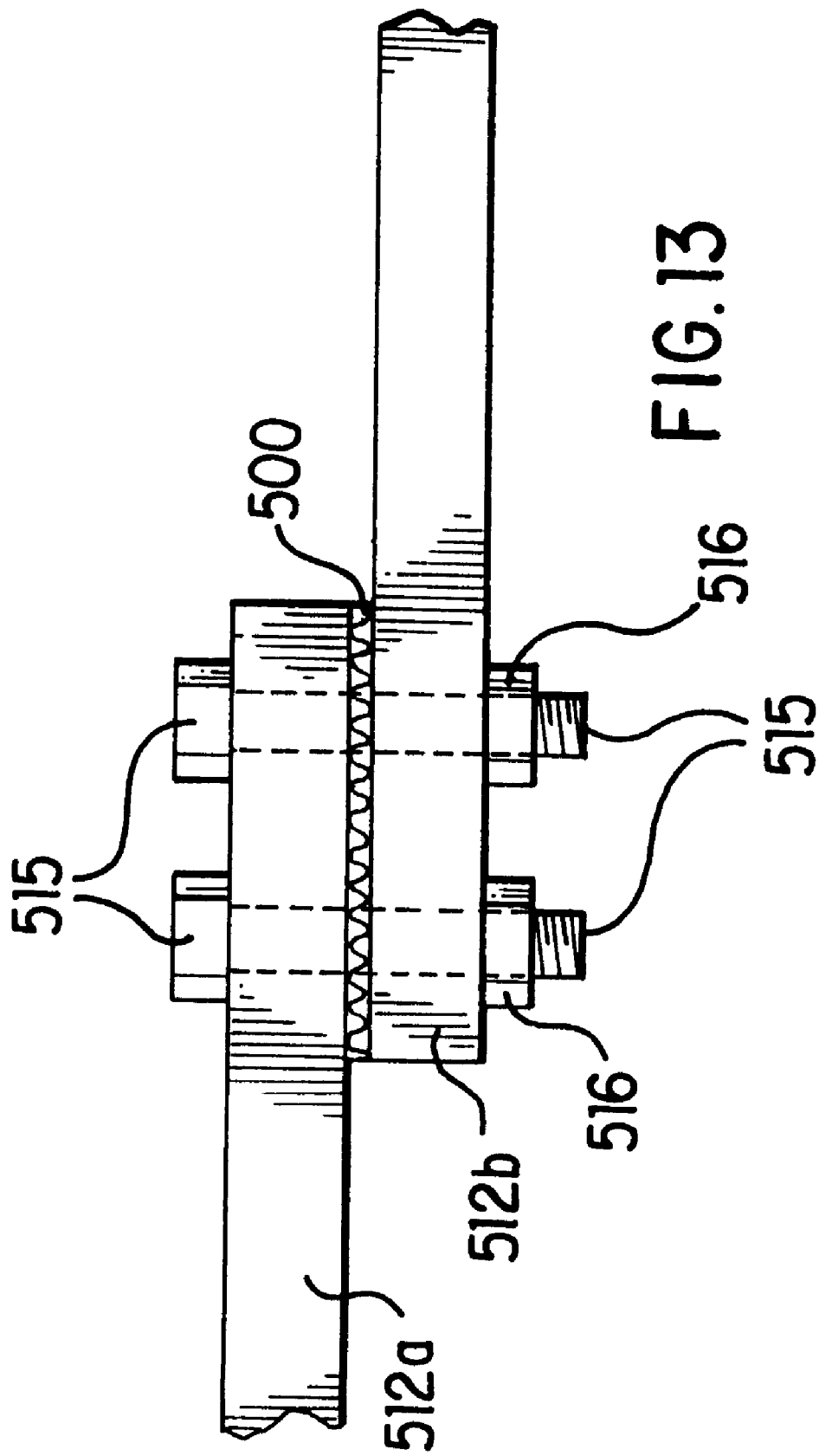
FIG. 13 is a side view of an embodiment of a bridge in accordance with the invention suitable for use in high-power distribution applications shown interposed between confronting buss bar contact surfaces.

The bridge in accordance with the invention is also particularly suited for use in applications involving electrical power distribution. As noted previously, these systems generally rely on electrical transmission via buss bars which are bolted in overlapping engagement to one another, to produce a pressure contact electrical union between confronting surfaces. Referring now to FIG. 13, an embodiment of a bridge in accordance with the invention for use in high power distribution is shown, generally designated 500. Bridge 500 may be comprised of any of the structural configurations within the scope of the invention as outlined above. For example, bridge 500 may include a contiguous bridge element, comprised for example of a mesh material, and which is optionally impregnated with a sealant, or by way of further example, may be comprised of particulate elements dispersed in a suitable carrier. Bridge 500 is interposed between a pair of overlapping buss bars 512a and 512b, bolted together by a pair of bolts 515 threadingly received in a pair of nuts 516. When bolts 515 and nuts 516 are tightened, exerting pressure on bridge 500 and the contact surfaces of buss bars 512a and 512b, a plurality of contact regions of bridge 500 are brought into intimate engagement with contact surfaces of buss bars 512a and 512b over at least area portions thereof, establishing a low-resistance electrical union. Since exposure of such electrical unions to water and other environmental factors are common, and which may reduce the long-term effectiveness of such buss bar connections, potentially resulting in catastrophic system failure, use of an optional sealant of the type described in the previous embodiments will reduce capillary seepage of moisture into the inner regions of contact engagement, when used in accordance with the guidelines stated above.

The discrete electrically conductive portions of the bridge in all of the various embodiments in accordance with the invention have been described in the above disclosure as being comprised of a highly conductive material, such as includes various metals. Since the bridge presents conduction regions on each of two opposed sides of the bridge, positioned to provide a plurality of contact points which face each of the confronting contacts, for optimum performance, particularly for use in critical applications, the material selected should ideally provide conductivity even in the event that these exposed contact points should become oxidized, for example prior to installation between confronting contacts. It is noted that silver provides such advantage, since notwithstanding such possible oxidation, silver oxide is itself conductive, in fact more conductive than metallic silver itself, and therefore conductivity of the bridge is not thereby compromised. It is further noted that the discrete electrically conductive portions of the bridge, i.e. either the conductive material comprising a contiguous bridge element, or the particles dispersed in a carrying agent, may include a composite of metals, including for example, an alloy of various component elements. In addition, the bridge element or particles in the carrying agent may comprise a particular metal providing structure plated with a selected other metal, to achieve desired malleability, cost, and/or conductive advantages. For example, a mesh of suitable metallic structure may be plated with silver to provide the above described oxidation advantages, while economizing product cost.

It is further noted that since a wide range of acceptable bridge configurations are possible, no specific structural dimensions have been cited above. However, a bridge which includes a contiguous bridge element structure for reception between an automobile battery post and cable, and which is comprised of a woven screen of 90 mesh and a filament diameter of 0.0045" has been found for example to perform satisfactorily in providing a low-resistance union. Similarly, a bridge comprised of particles of average diameter ranging from about 0.004" to about 0.010", for example, is also believed to provide satisfactory results. These examples are not intended however to limit the scope of the invention, which will be understood to embrace many other structurally dimensioned bridges outside the above cited ranges.

Numerous variations to the disclosed structure will be suggested to those skilled in the art. However, it is to be understood that the present disclosure relates to the preferred embodiment of the invention, for purposes of illustration only, and should not be construed as a limitation of the invention.

What is claimed is:

1. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions;

said mass being comprised of a plurality of discrete conductive particulate elements, said plurality of discrete conductive particulate elements being randomly arranged with respect to one another, and defining open spaces therebetween; and means for cohesion between collective ones of said plurality of discrete conductive particulate elements.

2. The bridge in accordance with claim 1, wherein: at least a portion of said plurality of discrete conductive particulate elements are detached from one another; and said means for cohesion includes a carrying agent throughout which said plurality of discrete conductive particulate elements are dispersed.

3. The bridge in accordance with claim 1, wherein:

at least a portion of said plurality of discrete conductive particulate elements are filamentous; and said means for cohesion includes a random tangling of said plurality of discrete conductive particulate elements with one another.

4. The bridge in accordance with claim 1, wherein said means for cohesion includes a carrying agent, said plurality of discrete conductive particulate elements being dispersed therethrough.

5. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions; and said mass being an integrated bridge element, said integrated bridge element being a conductive sheet of contiguous, unitary structure.

6. The bridge in accordance with claim 5, wherein said sheet is a mechanically deformed sheet presenting apices on opposed sides thereof, said bridge element thereby having a perceived envelope of thickness defined by a distance between respective loci of said apices on opposed sides, said perceived thickness being greater than an actual sheet thickness, said apices and spaces formed therebetween defining said plurality of conduction regions and said recessed regions, respectively.

7. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions; and said bridge element being a flat disk defining a centrally formed hole.

8. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions said mass being an integrated bridge element of contiguous structure; and said bridge element includes a textured surface defining said plurality of conduction regions and said recessed regions.

9. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions; and said bridge further including a sealant substantially disposed between said confronting contacts and said bridge element in said recessed regions.

10. The bridge in accordance with claim 9, wherein said bridge element is frustro-conically shaped.

11. The bridge in accordance with claim 9, wherein said sealant is curable.

12. The bridge in accordance with claim 11, wherein said sealant is elastic in a cured state.

13. A method for providing a low-resistance electrical connection between confronting contacts, comprising the steps of:

applying a sealant to a bridge, said bridge including first and second sides, said bridge further including a plurality of discrete conduction regions disposed along said first and second sides separated from one another by recessed regions, ones of said plurality of discrete conduction regions disposed on said first side of said bridge being electrically communicative with ones located on said second side;

interposing said bridge and said sealant between said confronting contacts; and urging together said confronting contacts into intimate contact engagement with at least area portions of at least a portion of said plurality of discrete conduction regions, thereby creating a plurality of conduction paths between said confronting contacts.

14. The method in accordance with claim 13, wherein said sealant is curable.

15. A method of providing a low-resistance electrical connection between confronting contacts, comprising the steps of:

interposing a bridge and a sealant between the confronting contacts, said bridge including a plurality of discrete conduction regions separated from one another by recessed regions, said bridge and said sealant extending over at least partially common area portions within the peripheral boundary of the confronting contacts; and urging together said confronting contacts to effect intimate contact engagement of the confronting contacts with at least a portion of said plurality of discrete conduction regions, ones of said plurality of discrete conduction regions in contact with a one of the confronting contacts being electrically communicative with ones of said plurality of discrete conduction regions in contact with a remaining one of the confronting contacts thereby creating a plurality of discrete conduction conduits an aggregate of which electrically bridges said confronting contacts, said sealant in a resultant connection being disposed to at least partially fill said recessed regions between said conduction regions.

16. The method in accordance with claim 15, wherein:

said bridge is comprised of a plurality of discrete conductive particulate elements, said plurality of discrete conductive particulate elements being randomly arranged with respect to one another, and said recessed regions being defined by open spaces therebetween; and said sealant provides means for cohesion between collective ones of said plurality of discrete conductive particulate elements.

17. The method in accordance with claim 15, wherein:

said bridge comprises a bridge element of cohesive structure; and said sealant is curable and elastic in a cured state, said sealant being applied to said bridge element prior to said step of interposing.

18. The method in accordance with claim 15, wherein:

said sealant is in a flowable state at the time of said step of urging.

19. The method in accordance with claim 18, wherein:

said sealant includes means for bonding to surfaces with which it is brought in contact.

20. The method in accordance with claim 18, wherein:

said bridge includes a bridge element, a relative hardness of said confronting contacts and said bridge element causing said bridge element to be imbedded at least partially into said confronting contacts as a result of said step of urging.

21. A bridge for conductively connecting confronting electrical contact surfaces, comprising:

mass receivable between said confronting electrical contact surfaces, said mass including first and second sides;

a plurality of discrete conduction regions disposed along said first and second sides, separated from one another by recessed regions, ones of said plurality of discrete conduction regions disposed on said first side of said bridge being electrically communicative with ones located on said second side, whereby a plurality of conduction paths are created between said confronting contacts when said confronting contacts are urged together into intimate contact with at least area portions of at least a portion of said plurality of discrete conduction regions; and said bridge element being a flat disk defining a slot extending from a peripheral edge to a central portion thereof.

* * * * *